United States Patent
Yamanis

(10) Patent No.: US 6,589,681 B1
(45) Date of Patent: Jul. 8, 2003

(54) SERIES/PARALLEL CONNECTION OF PLANAR FUEL CELL STACKS

(75) Inventor: Jean Yamanis, Morris Township, NJ (US)

(73) Assignee: Hybrid Power Generation Systems LLC, Los Angeles, CA (US)

( * ) Notice: Subject to any disclaimer, the term of this patent is extended or adjusted under 35 U.S.C. 154(b) by 0 days.

(21) Appl. No.: 09/520,276

(22) Filed: Mar. 6, 2000

(51) Int. Cl.[7] .................................................. H01M 2/00
(52) U.S. Cl. .............................. 429/34; 429/34; 429/12; 429/30; 429/31
(58) Field of Search ............................... 429/34, 12, 30, 429/31

(56) References Cited

U.S. PATENT DOCUMENTS

| | | | |
|---|---|---|---|
| 5,034,288 A | | 7/1991 | Bossel |
| 5,258,240 A | * | 11/1993 | Di Croce et al. ............. 429/31 |
| 5,549,982 A | * | 8/1996 | Akagi .......................... 429/30 |
| 5,750,279 A | * | 5/1998 | Carolan et al. ............... 429/32 |
| 5,874,183 A | | 2/1999 | Uematsu |

\* cited by examiner

Primary Examiner—Patrick Ryan
Assistant Examiner—Angela J. Martin
(74) Attorney, Agent, or Firm—Sutherland Asbill & Brennan LLP

(57) ABSTRACT

A parallel electrical connector between a first fuel cell stack having a first conducting plate and a second fuel cell stack having a second conducting plate includes a connector element affixed to the first and second conducting plates. The connector element is positioned adjacent a first open face of the first fuel cell stack and a second open face of the second fuel cell stack, wherein the first and second open faces are juxtaposed to one another. Also, the connector element is positioned substantially parallel to at least one of the first and second conducting plates. It is also configured to substantially match a configuration of at least one of the first and second conducting plates. Series-parallel connection is provided at the cell or higher cell level for two or more stacks.

16 Claims, 3 Drawing Sheets

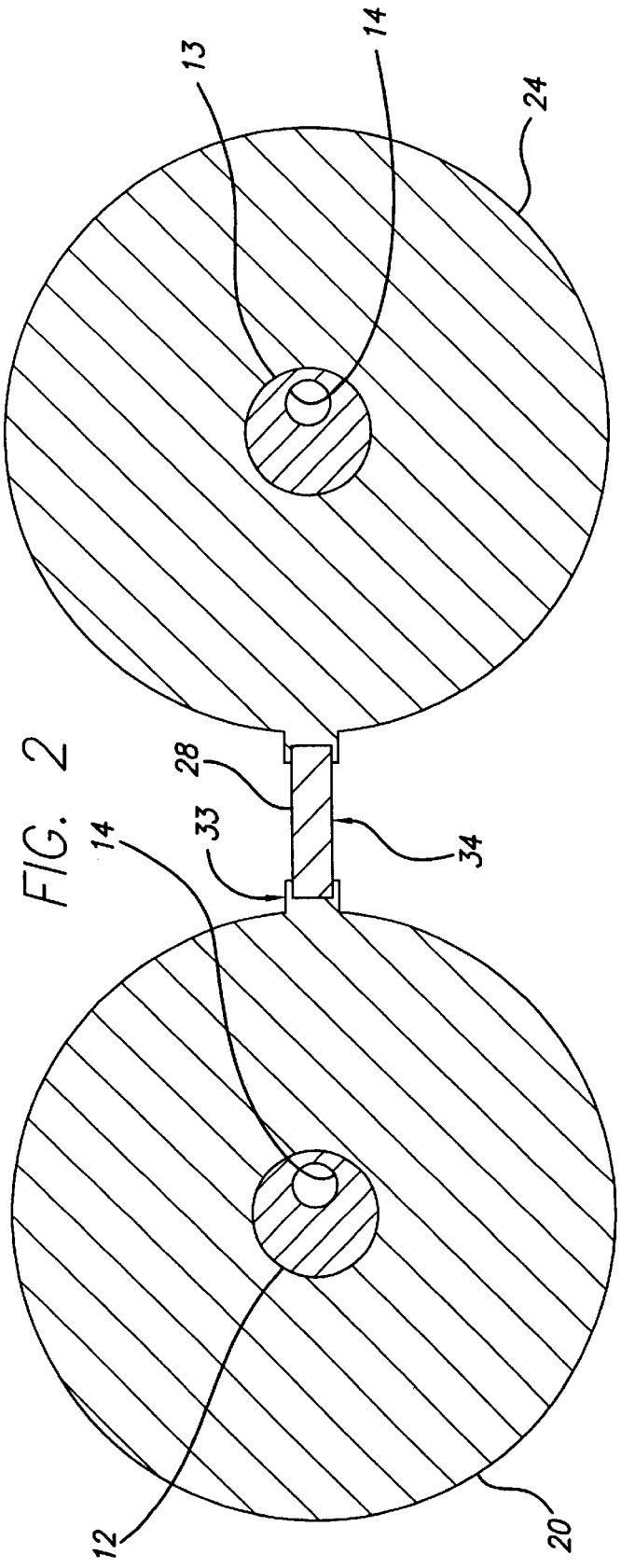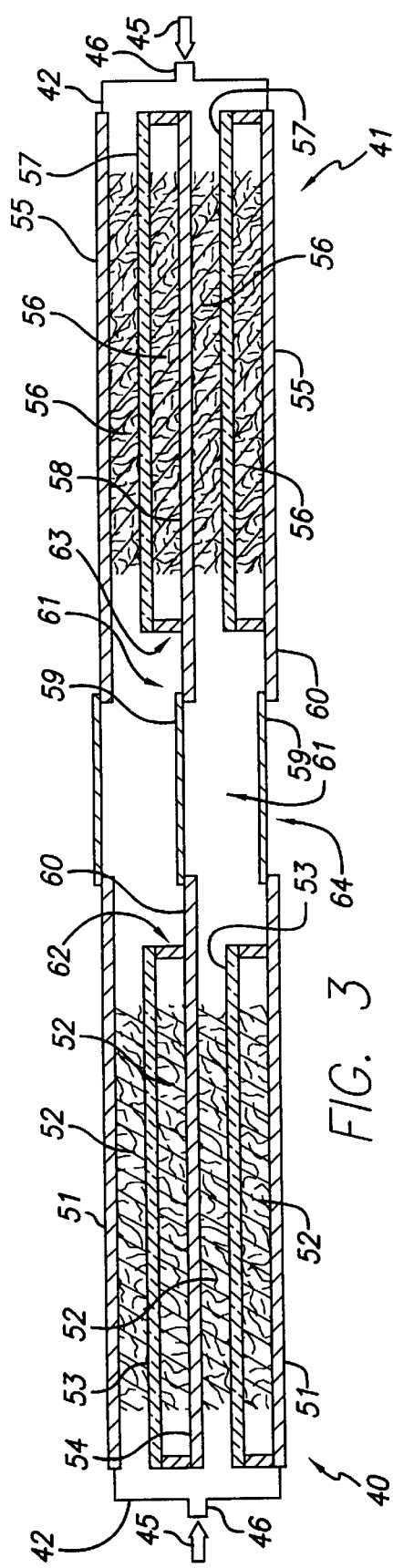

SERIES/PARALLEL CONNECTION OF PLANAR FUEL CELL STACKS

BACKGROUND OF THE INVENTION

This invention generally relates to the electrical connection of fuel cell stacks and, more particularly, to the series and parallel electrical connection of fuel cells, such as oxygen-ion conducting solid oxide fuel cells and proton conducting ceramic or polymer membrane fuel cells, in which the electrolyte is a solid.

A fuel cell is basically a galvanic conversion device that electrochemically reacts a fuel with an oxidant to generate a direct current. A fuel cell typically includes a cathode material, an electrolyte material, and an anode material. The electrolyte is a non-porous material sandwiched between the cathode and anode materials. An individual electrochemical cell usually generates a relatively small voltage. Thus, to achieve higher voltages that are practically useful, the individual electrochemical cells are connected together in series to form a stack. To achieve a desired current, individual cells are connected in parallel. Electrical connection between cells is achieved by the use of an electrical interconnect between the cathode and anode of adjacent cells. The electrical interconnect also provides for passageways which allow oxidant fluid to flow past the cathode and fuel fluid to flow past the anode, while keeping these fluids separated. Also typically included in the stack are ducts or manifolding to conduct the fuel and oxidant into and out of the stack.

The fuel and oxidant fluids are typically gases and are continuously passed through separate passageways. Electrochemical conversion occurs at or near the three-phase boundaries of each electrode (cathode and anode) and the electrolyte. The fuel is electrochemically reacted with the oxidant to produce a DC electrical output. The anode or fuel electrode enhances the rate at which electrochemical reactions occur on the fuel side. The cathode or oxidant electrode functions similarly on the oxidant side.

Fuel cells with solid electrolytes are the most promising technologies for power generation. Solid electrolytes are either ion conducting ceramic or polymer membranes. In the former instance, the electrolyte is typically made of a ceramic, such as dense yttria-stabilized zirconia (YSZ) ceramic, that is a nonconductor of electrons, which ensures that the electrons must pass through the external circuit to do useful work. With such an electrolyte, the anode is oftentimes made of nickel/YSZ cermet and the cathode is oftentimes made of doped lanthanum manganite.

Perhaps the most advanced construction with ceramic membranes is the tubular solid oxide fuel cell based on zirconia. The tubular construction can be assembled into relatively large units without seals and this is its biggest engineering advantage. However, tubular solid oxide fuel cells are fabricated by electrochemical vapor deposition processes, which are slow and costly. The tubular geometry of these fuel cells also limits the specific power density, both on weight and volume bases, to low values. The electron conduction paths are also long and lead to high energy losses due to internal resistance heating. For these reasons, other constructions are actively being pursued.

One common alternative construction to the tubular construction is a planar construction that resembles a cross-flow heat exchanger in a cubic configuration. The planar cross flow fuel cell is built from alternating flat single cell membranes (which are trilayer anode/electrolyte/cathode structures) and bipolar plates (which conduct current from cell to cell and provide channels for gas flow into a cubic structure or stack). The bipolar plates are oftentimes made of suitable metallic materials. The cross-flow stack is manifolded externally on four faces for fuel and oxidant gas management.

Another alternative construction to the tubular design is a radial or co-flow design. An annular shaped anode and cathode sandwich an electrolyte therebetween. Annular shaped separator plates sandwich the combination of anode, cathode, and electrolyte. A fuel manifold and an oxidant manifold respectively direct fuel and oxidant to a central portion of the stack so that the fuel and oxidant can flow radially outward from the manifolds.

Nevertheless, in either the radial or cross-flow fuel cell stack designs, electrical connection between fuel cell stacks remains an issue. In particular, both designs impose a series electrical connection between stacks, while making a parallel electrical connection difficult. Further, the current art of connecting one stack to another leads to the disadvantage of rendering all of the connected stacks inoperable if one cell or stack becomes inoperable. Additionally, an electrical connection between stacks can result in an increased size of the overall dimensions of the connected stacks. Examples of various electrical connections of fuel cell stacks are found in U.S. Pat. Nos. 5,874,183; 5,750,279; 5,258,240; and 5,034,288.

As can be seen, there is a need for an improved apparatus and method of electrical connection for fuel stacks having solid electrolytes. In particular, there is a need for a parallel electrical connection between fuel stacks having either a cross-flow design or a radial flow design. An apparatus and method are needed that allows an electrical connection among the stacks, even in the event that one cell or stack becomes inoperable. Also needed is an apparatus and method that maintains the benefit of a reduced size for a cross-flow or radial flow stack, while still providing a parallel electrical connection.

SUMMARY OF THE INVENTION

Accordingly, an object of the present invention is to provide an electrical connector between the current conducting plates of fuel cell stacks having solid electrolytes.

Another object of the present invention is to provide a parallel electrical connector for cross-flow and radial flow fuel cell stacks at the "cell level" or at a "higher cell level." The "cell level" is defined as having electrical connection between each cell of both stacks. "Higher cell level" is defined as a set of two or more unconnected cells that intervene between connected cells of adjacent stacks. In other words, not all of the cells are connected in parallel.

Yet another object of the present invention is to provide a simple and cost-efficient apparatus and method of electrically connecting in parallel two or more fuel cell stacks at the cell or higher cell level.

An additional object of the present invention is to provide high power density of fuel cell stacks, while allowing series and parallel electrical connection among the stacks at the cell or higher cell level.

A further object of the present invention is to provide a parallel electrical connection among fuel cell stacks to circumvent the possibility that one or more cells of a stack become inoperable.

The present invention achieves the foregoing objects, as well as others, by a parallel electrical connector between a first conducting plate of a first fuel cell stack and a second conducting plate of a second fuel cell stack, comprising a connector element affixed to the first and second conducting plates. The connector element is adjacent a first open face of the first fuel cell stack and a second open face of the second fuel cell stack. The connector is preferably made of the same material as the conducting plates. Also, the connector element is positioned substantially parallel to at least one of the first and second conducting plates.

These and other features, aspects and advantages of the present invention will become better understood with reference to the following drawings, description and claims.

BRIEF DESCRIPTION OF THE DRAWINGS

FIG. 2 is a diagram of a top view of fuel cell stacks shown in FIG. 1;

FIG. 3 is a diagram of a side view of two cross-flow fuel cell stacks connected together according to an embodiment of the present invention;

DETAILED DESCRIPTION OF THE INVENTION

In ceramic/metal solid oxide fuel cell stacks, the series/parallel connectivity at the cell level is a very important issue. This arises from the relatively poor reliability of the ceramic cell. Thin ceramic cell membranes with very porous electrodes are brittle and have very little strength. They are loaded in compression and that would be good, if the cells were perfectly flat and of uniform thickness. However, the cells are not perfectly flat nor of uniform thickness. As a result, the cells are placed under tensile and, perhaps, bending stresses when they are assembled into a stack. The combination of these tensile and/or bending stresses with stresses arising from volume change during the reduction of the NiO-based anode and with thermal stresses increases the probability of cell fracture. Cell fracture leads to stack breakdown and catastrophic failure.

The probability of failure of cells in a stack is not known, but for a given probability of failure, the weakest link theory allows estimation of the probability of failure for a stack, which is connected only in series. Let it be assumed that a 1 kW stack requires 50 cells in series and that all the cells have the same probability of failure. If the failure probability for each cell is 0.01, then the probability of survival is 0.99 and the probability of having a good stack of 50 cells connected in series is $0.99^{50}$, that is 0.99 raised to the power of 50, or 0.605. So, the probability of having a bad stack of 50 cells in series is 0.395, that is, 1 minus 0.605, or about 40%. A 40% probability of failure is extremely high, and, of course, this probability gets a lot worse fast if one assumes higher probabilities for cell failure in a stack. The way to get around these high odds of stack failure is to connect the cells in series/parallel fashion at the cell level or at a higher level.

The same ideas for stack failure based on cell failure also hold for PEM fuel cells as well, although the modes of failure and the probability of failure may be different.

Figure 1:
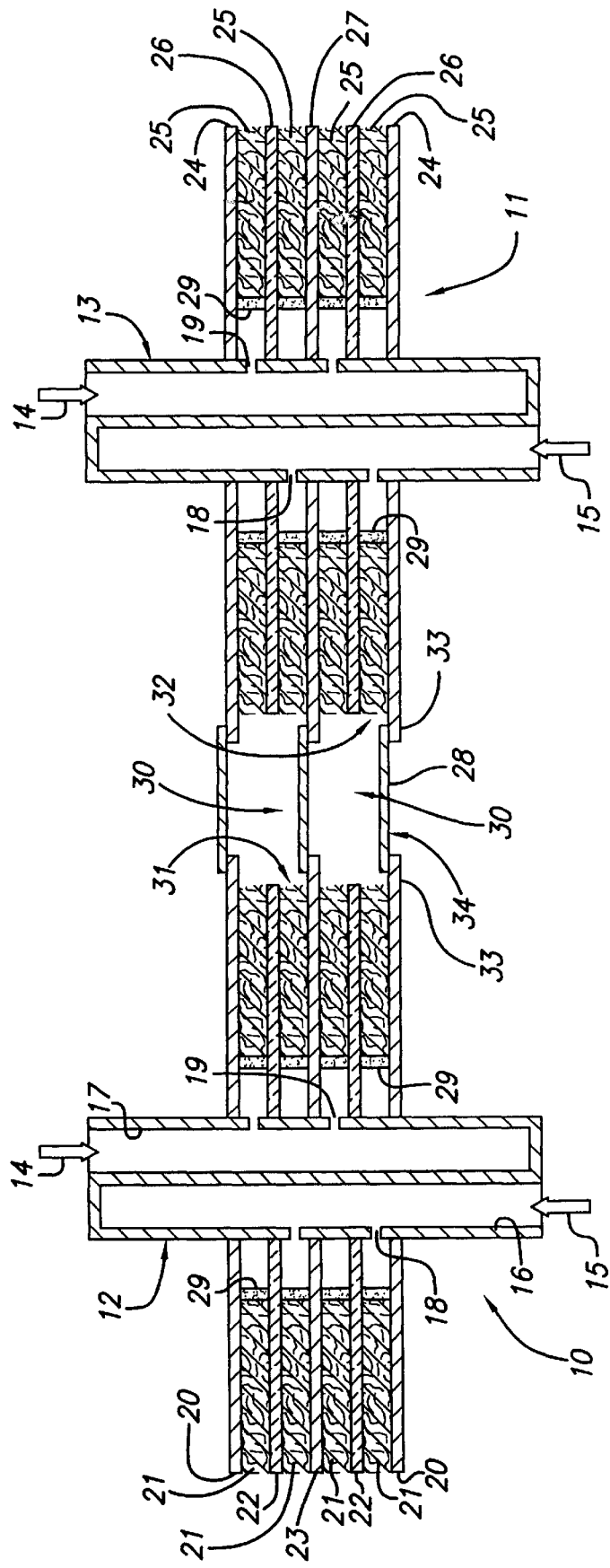
FIG. 1 is a diagram of a side view of two radial flow fuel cell stacks connected together according to an embodiment of the present invention.
Figure 4:
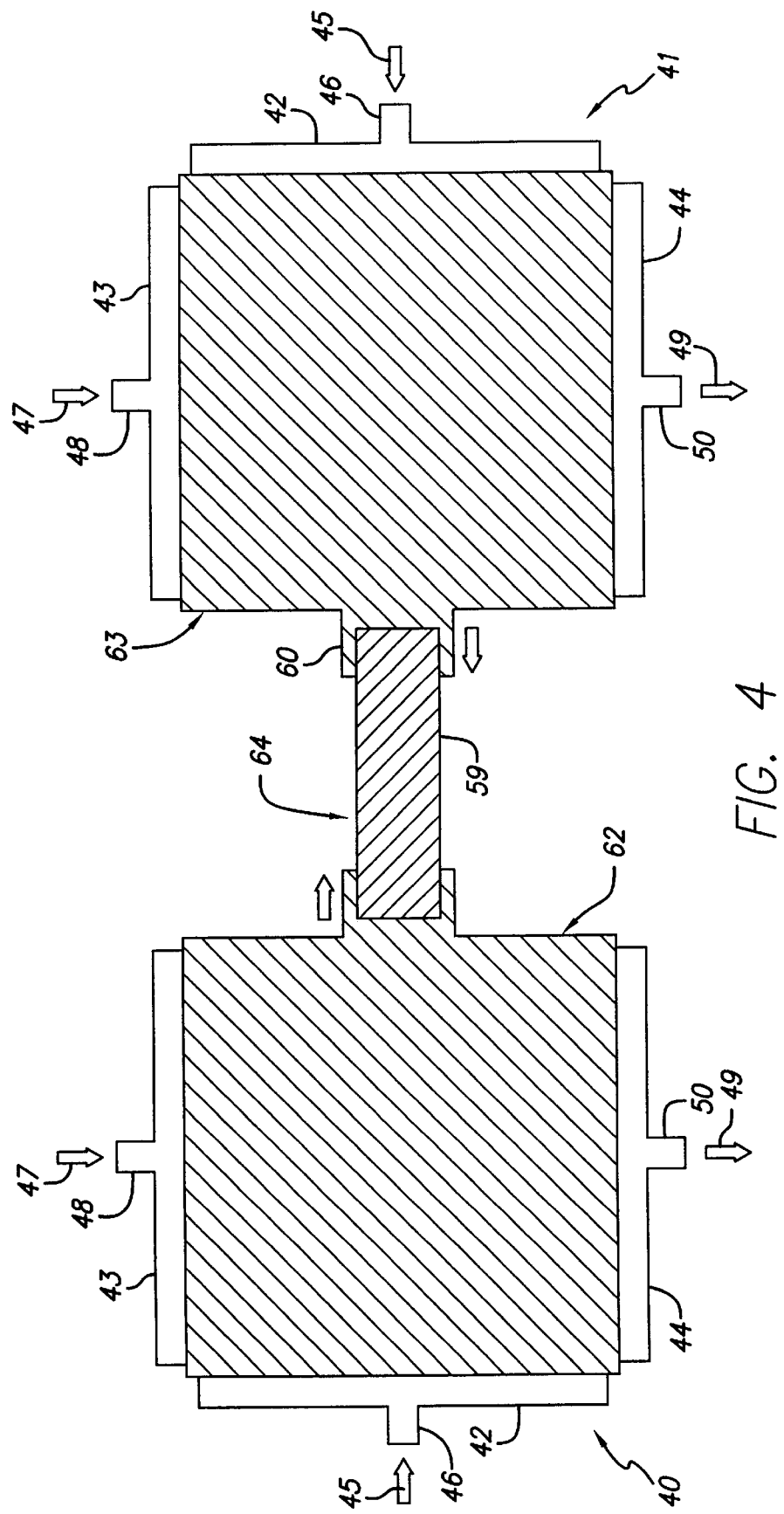
FIG. 4 is a diagram of a top view of fuel cell stacks shown in FIG. 3.

Conceptually, a series/parallel connection is possible for both the radial and externally face-manifolded cross flow designs by means of the separator plates. The radial design with its open architecture, i.e., no outlet manifolds, facilitates the series/parallel connection at the cell level or at a higher cell level. FIGS. 1 and 2 show a schematic arrangement and parallel connection of two radial stacks. The externally face-manifolded cross flow design could be connected in series/parallel fashion at the cell level, or at a higher cell level, provided the stack face for the air outlet stream in each stack is left without a manifold. FIGS. 3 and 4 show a schematic arrangement and parallel connection of two cross flow stacks.

In FIG. 1, a first radial fuel cell stack 10 and a second radial fuel cell stack 11 are electrically connected in series and in parallel according to one embodiment of the present invention. The first and second fuel cell stacks 10, 11 are generally designed for the use of solid electrolytes. Accordingly, the present invention contemplates that the fuel cell stacks 10, 11 can be used in the context of at least solid oxide fuel cells and proton exchange membrane fuel cells well known in the art. For purposes of illustration, the first and second fuel cell stacks 10, 11 are depicted as radial flow fuel cell stacks.

The radial fuel cell stack 10, in this embodiment, has an overall circular configuration. Accordingly, from a top cross sectional view, the various components of the fuel cell stack 10 described below have a circular cross section as shown in FIG. 2. The radial fuel cell stack 10 includes a first internal manifold 12 that flows gases 14, 15 into the stack 10. Although various materials can be used to construct the manifold 12, preferred materials include ceramics, glass-ceramics, metallic alloys, oxidation resistant metallic alloys, metal-ceramic composites and intermetallics. The preferred external geometrical shape of the internal manifold 11 is a right cylinder but other shapes could obviously be used.

The internal manifold 12 is preferably positioned in a central area or central axis of the radial stack 10. When viewed from FIG. 1, the first internal manifold 12 extends from a first or topside of the stack 10, through the stack 10, and out of a second or bottom side of the stack 10. Formed within the first internal manifold 12 are an interior cavity 16 and an interior cavity 17 that extend along the longitudinal length of the manifold 12. Both cavities 16, 17 flow the gases 14, 15 into the manifold 12. In this embodiment, the interior cavity 16 flows the fuel gas 15, while the interior cavity 17 flows the oxidant gas 14. Nevertheless, it can be appreciated that either cavity 16, 17 can flow either gas 14, 15 depending upon the orientation of single cells 22 described below.

As seen in FIG. 1, the first internal manifold 12 describes a plurality of openings 18 and openings 19. The openings 18, 19 provide a means for the gases 14, 15 to flow out of the interior cavities 16, 17. In this embodiment, the openings 18 allow the fuel 15 to flow out of the cavity 16, while the openings 19 allow the oxidant 14 to flow out of the cavity 17. The openings 19 are properly sized to enable the uniform distribution of the oxidant gas 14 to each and every cell 22 in the radial stack 10. Similarly, the openings 18 are properly sized to enable the uniform distribution of the fuel gas 15 to each and every cell 22 in the stack 10.

The exterior surface of the first internal manifold 12 is sealed to the inner peripheries of a first end or current collector plate 20, a first cell 22, and a first separator or current conducting plate 23. The means for sealing such elements to the manifold 12 are well known in the art and include glass-based sealant materials. The first end plate 20, first cell 22, and first separator plate 23 are constructed and serve functions according to that well known in the art.

For the embodiment shown in FIGS. 1 and 2, an end plate 20 is disposed at the top and bottom of the first radial fuel cell stack 10. The end plates 20 sandwich therebetween a sequence (starting from top to bottom) of a first interconnect 21, a first cell 22, a first interconnect 21, a first separator plate 23, a first interconnect 21, a first cell 22, and a first interconnect 21, all of which are in series electrical connection. However, it should be understood that the foregoing sequence can be extended to incorporate additional single cells 22, or even be shortened to delete a single cell 22. In such event, the number of interconnects 21 and separator plates 23 will accordingly change.

The annular and planar first end plates 20 serve to collect current generated by the first cells 22 and can be constructed of electrically conducting materials such as metals, oxidation resistant alloys, stainless steel, or superalloys. Each of the end plates 20 extends from the outer periphery of the first stack 10 to the outer periphery of the first internal manifold 12. The first interconnects or current conductor elements 21 are also annular in configuration and fixed to their immediately adjacent components of first end plates 20 or first separator plate 23 by such means as brazing or bonding. The first interconnects 21 are preferably made of an electronic conductor element for carrying current from one single cell 22 to the next so as to form a series electrical connection. Suitable materials for the first interconnects 21 include metallic alloys, intermetallics, metal-ceramic composites, and electron conducting ceramics. The first interconnects 21 preferably have skeletal structures so that they allow unimpeded flow of oxidant 14 and fuel 15, as described hereinafter. The material comprising the first interconnects 21 should be distributed uniformly in all directions in the space between each single cell 22 and separator plate 23 (or end plate 20) so as to facilitate the radial flow of oxidant 14 and fuel 15 gases.

The outer peripheries of the interconnects 21 extend substantially to the outer peripheries of the end plates 20 (or separator plate 23). The inner peripheries of the interconnects 21 extend toward but not to the outer periphery of the first internal manifold 12. One set of first interconnects 21 are in flow communication with the openings 18 and, thereby, the fuel 15. Another set of first interconnects 21 are in flow communication with the openings 19 and, thereby, the oxidant 14. This enables the first interconnects 21 to channel the oxidant 14 across a cathode side of the single cells 22 and the fuel 15 across an anode side of the single cells 22.

The first interconnects 21 and first separator plate 23 are made of metal foils, i.e., thin metal sheets, so as to lead to lightweight stacks. Yet, these components need to have sufficient thickness to provide the desired lifetime for the radial stack 10. The metal foils can be formed into a variety of geometrical shapes which provide for uniform fluid flow in the radial direction and sufficient electrical current conduction capacity in the longitudinal direction. One preferred example of a first interconnect 21 structure is thin metal foils formed into off-set fin shapes and sliced and arranged so as to facilitate the radial flow direction of the oxidant and fuel gases 14, 15. Another example of a preferred interconnect 21 structure is thin metal plates of very high porosity, i.e., porosity in excess of 90% by volume, such as nickel foam which can be used as the interconnect 21 on the anode side of the cell 22.

An annular and planar porous element 29 is radially positioned between the first manifold 12 and each of the first interconnects 21. Thereby, a porous element 29 is disposed adjacent the openings 18, 19. The porous elements 29 serve to uniformly distribute oxidant 14 or fuel 15 gases to the cells 22 over 360° and can be made of materials such as metallic alloys, intermetallics, metal-ceramic composites, ceramics, and glass-ceramics.

The materials used for the first internal manifold 12, the porous elements 29, the first end plates 20, the separator plate 23 and the first interconnects 21 should be selected so as to have thermal expansion behavior similar to the cell 22 material so that thermal stresses do not develop during thermal cycling from ambient to the operating temperature and back. In the case of the interconnect 21, some thermal expansion mismatch can be accommodated by incorporating compliance aspects in this part either by geometrical design or by proper selection of the material. Nickel foam, for example, is inherently a compliant material and its thermal expansion mismatch with the cell 22 does not lead to damaging thermal stresses.

As mentioned above, the single cells 22 have an anode side and a cathode side. These two sides are provided by the well known tri-layer construction of anode—electrolyte—cathode. The anode layer in the cell 22 can be made of nickel/YSZ cermet; the electrolyte layer can be made of yttria-stabilized zirconia (YSZ); and the cathode layer can be made of strontium-doped lanthanum manganite. Each of the single cells 22 preferably extends from the outer periphery of the stack 10 and to the outer periphery of the internal manifold 12.

The separator plate 23 that is disposed between two interconnects 21 is annular and planar in configuration for this embodiment. The separator plate 23 serves to separate the flows of oxidant 14 and fuel 15 as they pass through the interconnects 21. The separator plate 23 must be made of an electronic conductor material to also carry the current generated from one single cell 22 to the next so as to provide a series electrical connection. Thus, the separator plate 23 may be made from metallic alloys, intermetallics, metal-ceramic composites, and electronic conducting ceramics. It too extends from the outer periphery of the stack 10 and to the outer periphery of the internal manifold 12.

The second radial fuel cell stack 11 is preferably constructed in a fashion similar to the first radial fuel cell stack 10. However, different constructions can be used. Having a construction and function preferably similar to the first radial stack 10, the second radial stack 11 includes a second manifold 13 similar to the first manifold 12. The second radial stack 11 further includes second end or current collector plates 24 that are similar to the first end plates 20. Second interconnect or current conductor elements 25 of the second radial stack 11 are similar to the first interconnects 21, second cells 26 are similar to the first cells 22, and a second separator or current conducting plate 27 is similar to the first separator plate 23.

To provide an electrical parallel connection between the first and second radial stacks 10, 11, the stacks 10, 11 are juxtaposed to one another. Thereby, a first open face or side 31 of the first stack 10 is opposed a second open face or side 32 of the second stack 11. The first open face 31 allows, in the embodiment of FIG. 1, the oxidant gas 14 to flow out of the first stack 10, while the second open face 32 allows the fuel gas 15 to flow out of the second stack 11. A plurality of parallel electrical connectors 34 are provided between and adjacent to the first and second open faces 31, 32 (FIG. 1) and each connector includes a connector element 28 and a tab element 33 (FIG. 2).

Preferably, a connector element 28 is fixed between the first and second end plates 20, 24 and the first and second separator plates 23, 27, as seen in FIG. 1. As such, the connector elements 28 preferably have a configuration that is substantially planar and rectangular. In a preferred embodiment, the connector elements 28 extend circumferentially about only a portion of the outer periphery of the stack 10, 11, namely, the first and second open faces 31, 32, respectively (FIG. 2). The orientations of the connector elements 28 are substantially parallel to the first and second end plates 20, 24, as well as the first and second separator plates 23, 27, and provide series-parallel connection for each cell 22, 26, which will be referred to as series-parallel connection at the cell level. Series-parallel connections are preferably made at the cell level, but other configurations are possible. The connector elements 28 can be made of electrically conducting materials such as metallic alloys, intermetallics, metal-ceramic composites, and electronic conducting ceramics in order to electrically connect current conducting plates or elements, such as the end plates 20, 24 and/or separator plates 23, 27, to one another.

The tab elements 33 are preferably integral parts of the respective conducting plates (i.e., the end plates 20, 24 and/or separator plates 23, 27) of each stack 10, 11. The tab elements 33 are also preferably planar and rectangular in configuration (FIG. 2). The opposing ends of the connector elements 28 are affixed to the tab elements 33 of the conducting plates by welding, tack-welding, brazing or by mechanical fasteners. Like the conducting plates, the tab elements 33 can be made of electrically conducting materials such as metallic alloys, intermetallics, metal-ceramic composites, and electronic conducting ceramics.

As best seen in FIG. 1, the combination of tab elements 33 and connector elements 28 create a void space 30 between the first and second open faces 31, 32. Through the void space 30, gases can flow out of the adjacent fuel cell stacks 10, 11.

The parallel electrical connectors 34 allow current to pass between adjacent stacks 10, 11. For example, such a parallel connection can be useful to minimize the adverse effects that might otherwise exist when a first cell 22 of the first stack 10 becomes inoperable. With the parallel electrical connectors, the inoperable first cell 22 can be electrically bypassed by having the current flow through an electrical connector between conducting plates and into the second stack 11.

The parallel electrical connectors of the present invention can also be used in the context of cross flow fuel cell stacks, as shown in FIGS. 3 and 4. In FIG. 3, a first cross flow fuel cell stack 40 and a second cross flow fuel stack 41 are provided with conventional designs known in the art. The first cross flow stack 40 includes a first end or current collector plate 51 disposed at the top and bottom of the stack 40. The first end plates 51 sandwich a sequence (starting from top to bottom) of, for example, a first interconnect or current conductor element 52, a first cell 52, a first interconnect 53, a first separator or current conducting plate 54, a first interconnect 52, a first cell 53, and a first interconnect 52. Likewise, the second cross flow stack 41 includes second end or current collector plates 55 that sandwich, for example, a second interconnect or current conductor element 56, a second cell 57, a second interconnect 56, a second separator or current conducting plate 58, a second interconnect 56, a second cell 57, and a second interconnect 56.

As better shown in FIG. 4, a gas or oxidant 45 flows through a gas or oxidant inlet 46 of a gas or oxidant manifold 42 into the first stack 40 and out the opposite side of the stack. Similarly, a gas or fuel 47 enters a gas or fuel inlet 48 of a gas or fuel manifold 43 that flows the fuel 47 into the first stack 40. Opposite the manifold 43 is a gas or fuel manifold 44 that flows a gas or fuel 49 out of the first stack 40 via a gas or fuel outlet 50. In this embodiment, additional gas manifolds 42, 43, 44 communicate with the second cross flow stack 41 in a fashion similar to the first stack 40.

Like with the radial stacks described above, electrical parallel connectors 64 electrically connect the first and second cross flow stacks 40, 41. The connection is made between current conducting plates or elements, such as the end plates 51, 55 and/or separator plates 54, 58 at the cell level. The electrical connector includes a connector element 59 that preferably has a configuration that is substantially planar and rectangular so as to match the configuration of the tabs 60 of the first and second end plates 51, 55 and/or first and second separator plates 54, 58. As in the above embodiment, the connector elements 59 extend across only a portion of the outer periphery of the stacks 40, 41, namely, the first and second open faces 62, 63, respectively. The orientation of the connector elements 59 is substantially parallel to the first and second end plates 51, 55, as well as the first and second separator plates 54, 58.

The electrical connectors 59 are affixed to tab elements 60 which are preferably planar and rectangular in configuration (FIGS. 3 and 4). The tab elements 60 are also preferably integral parts of the conducting plates or elements of the stacks 40, 41. The connector elements 59 are affixed to the tab elements 60 by welding, tack-welding, brazing or by mechanical fasteners. However, other suitable configurations for attachment are for example, oversized conducting plates that provide space for attachment. The connector is preferably made of the same material as the conducting plates, to minimize the possibility of damage by galvanic corrosion or thermal stresses. The combination of tab elements 60 and connector elements 59 create a void space 61 between the first and second open faces 62, 63 through which gases can flow out of the fuel cell stacks 40, 41.

Though FIGS. 1 and 2 show the series-parallel connection of two radial stacks 10, 11 at the cell level, it should be understood by those skilled in the art that three or four radial stacks can be connected in series-parallel connection at the cell level or at different (i.e., higher cell) levels. As a further alternative, a triangular arrangement of three radial stacks is a space-saving arrangement frequently used in tube-and-shell heat exchangers and it could be useful in the series-parallel connection of radial stacks. Moreover, the series-parallel connection of three or more radial stacks may be necessary from the point of view of limiting current densities at any cell or set of cells to reasonable levels. Similarly, although FIGS. 3 and 4 show the series-parallel connection of two cross flow stacks 40, 41 at the cell level, it should be understood by those skilled in the art that three or four cross stacks can be connected in series-parallel connection at the cell or at higher cell level.

In the case of series-parallel connection of two or more stacks at the cell or higher cell level, the parallel connector element will not be rectangular as indicated for the case of two radial or cross flow stacks but will have a different geometrical shape and configuration to fit the situation.

For any of the stack arrangements discussed hereandabove, the parallel connector element may have a configuration other than planar and rectangular. For example, the parallel connector element may be a single or multiple strand wire or have some other geometrical shape and configuration.

To those skilled in the art, it can be seen that the present invention provides an improved apparatus and method of electrical connection for fuel stacks having solid electrolytes. In particular, the present invention provides series and parallel electrical connection between fuel stacks having either a cross-flow design or a radial flow design. An apparatus and method are provided that allows an electrical connection among the stacks, even in the event that one cell or stack becomes inoperable. Also provided by the present invention is an apparatus and method that maintains the benefit of a reduced size for a cross-flow or radial flow stack, while still providing a series and parallel electrical connection.

It should be understood, of course, that the foregoing relates to preferred embodiments of the invention and that modifications may be made without departing from the spirit and scope of the invention as set forth in the following claims. Similarly, the various parts may be called by different names without departing from the spirit and scope of the invention as set forth in the following claims.

I claim:

1. A parallel electrical connector system between a first fuel cell stack arid a second fuel cell stack, comprising:
   a first connector element affixed to a first current conducting end plate of the first fuel cell stack and a first current conducting end plate of the second fuel cell stack;
   a second connector element affixed to a current conducting separator plate of the first fuel cell stack and a current conducting separator plate of the second fuel cell stack;
   a third connector element affixed to a second current conducting end plate of the first fuel cell stack and a second current conducting end plate of the second fuel cell stack;
   wherein an electrical current flows between said first fuel cell stack and said second fuel cell stack through said first connector element, second connector element, and third connector element.

2. The electrical connector system of claim 1, wherein said first connector element, second connector element, and third connector element is positioned adjacent a first open face of said first fuel cell stack and a second open face of said second fuel cell stack.

3. The electrical connector system of claim 2, wherein said first and second open faces are opposed to one another.

4. The electrical connector system of claim 1, wherein said first connector element, second connector element, and third connector element are positioned substantially parallel to the first conducting end plate, the conducting separator plate, and the second conducting end plate.

5. The electrical connector system of claim 1, wherein said first connector element second connector element, and third connector element have a substantially planar configuration.

6. The electrical connector system of claim 1, wherein said first connector element second connector element, and third connector element have a substantially cylindrical configuration.

7. The electrical connector system of claim 1, wherein said first connector element, second connector element, and third connector element have a substantially annular configuration.

8. The electrical connector system of claim 1, wherein said first connector element, second connector element, and third connector element have a substantially rectangular configuration.

9. The electrical connector system of claim 1, wherein said first and second fuel cell stacks provide a cross flow of a fuel and an oxidant.

10. The electrical connector system of claim 1, wherein said first and second fuel cell stacks provide a radial flow of a fuel and an oxidant.

11. A parallel electrical connector system between a first fuel cell stack and a second fuel cell stack, comprising:
    a first connector element affixed to and positioned substantially parallel to a first current conducting end plate of the first fuel cell stack and a first current conducting end plate of the second fuel cell stack, said first connector element having a substantially planar configuration;
    a second connector element affixed to and positioned substantially parallel to a current conducting separator plate of the first fuel cell stack and a current conducting separator plate of the second fuel cell stack, said second connector element having a substantially planar configuration;
    a third connector element affixed to and positioned substantially parallel to a second current conducting end plate of the first fuel cell stack and a second current conducting end plate of the second fuel cell stack, said gird connector element having a substantially planar configuration;
    wherein an electrical current flows between said fist fuel cell stack and said second fuel cell stack through said first connector element, second connector element, and third connector element.

12. A parallel electrical connector system between a first fuel cell stack and a second fuel cell stack, comprising:
    a first connector element affixed to and positioned substantially parallel to a first current conducting end plate of the first fuel cell stack and a first current conducting end plate of the second fuel cell stack, said first connector element having a substantially cylindrical configuration;
    a second connector element affixed to and positioned substantially parallel to a current conducting separator plate of the first fuel cell stack and a current conducting separator plate of the second fuel cell stack, said second connector element having a substantially cylindrical configuration;
    a third connector element affixed to and positioned substantially parallel to a second current conducting end plate of the first fuel cell stack and a second current conducting end plate of the second fuel cell stack, said third connector element having a substantially cylindrical configuration;
    wherein an electrical current flows between said first fuel cell stack and said second fuel cell stack through said first connector element, second connector element, and third connector element.

13. A parallel electrical connector system between two or more fuel cell stacks having at least three corresponding electrical current conducting plates, comprising:
    connector elements affixed to said corresponding electrical current conducting plates, said connector elements having a substantially planar configuration;
    wherein current flows between said conducting plates through said connector elements.

14. The electrical connector system of claim 13, further comprising a plurality of connector elements connected to said current conducting plates at either a cell level or higher cell level.

15. A parallel electrical connector system between two or more fuel cell stacks having at least three corresponding electrical current conducting plates, comprising:
    connector elements affixed to said corresponding electrical conducting plates, said connector elements having a substantially cylindrical configuration;
    wherein current flows between said conducting plates through said connector elements.

16. The electrical connector system of claim 15, further comprising a plurality of connector elements connected to said current conducting plates at either a cell level or a higher cell level.

* * * * *